US009479593B2

(12) United States Patent
Seon (10) Patent No.: US 9,479,593 B2
(45) Date of Patent: Oct. 25, 2016

(54) MEDIA TRANSMISSION METHOD AND APPARATUS

(75) Inventor: Min-Kyu Seon, Gunpo-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 2335 days.

(21) Appl. No.: 11/357,194

(22) Filed: Feb. 21, 2006

(65) Prior Publication Data

US 2006/0203035 A1     Sep. 14, 2006

(30) Foreign Application Priority Data

Mar. 8, 2005 (KR) .................. 10-2005-0019337

(51) Int. Cl.
*H04L 29/08* (2006.01)
*H04L 29/06* (2006.01)

(52) U.S. Cl.
CPC .............. *H04L 67/14* (2013.01); *H04L 69/24* (2013.01)

(58) Field of Classification Search
CPC . C07C 2101/14; C07C 403/02; H04L 67/14; H04L 69/24
USPC ................................ 370/352–356, 320, 338
See application file for complete search history.

(56) References Cited

U.S. PATENT DOCUMENTS

| | | | |
|---|---|---|---|
| 7,233,605 B1* | 6/2007 | Oran | 370/526 |
| 7,260,060 B1* | 8/2007 | Abaye | H04W 28/16 370/230 |
| 7,277,423 B1* | 10/2007 | Welch | 370/352 |
| 7,330,453 B1* | 2/2008 | Borella et al. | 370/338 |
| 7,508,821 B2* | 3/2009 | Kennedy | H04M 7/0072 370/338 |
| 7,529,813 B2* | 5/2009 | Lim et al. | 709/219 |
| 8,914,522 B2* | 12/2014 | Rao | H04L 1/1854 709/223 |
| 2004/0125757 A1* | 7/2004 | Mela et al. | 370/261 |
| 2004/0199649 A1* | 10/2004 | Tarnanen et al. | 709/230 |
| 2004/0202295 A1* | 10/2004 | Shen et al. | 379/112.01 |
| 2005/0005014 A1* | 1/2005 | Holmes | H04L 12/581 709/227 |
| 2005/0141541 A1* | 6/2005 | Cuny et al. | 370/437 |
| 2005/0141691 A1* | 6/2005 | Wengrovitz | H04L 12/581 379/211.02 |
| 2005/0203912 A1* | 9/2005 | Beach | H04R 1/1091 709/221 |
| 2005/0288045 A1* | 12/2005 | Yang | H04W 76/023 455/466 |
| 2006/0037072 A1* | 2/2006 | Rao | H04L 1/1854 726/14 |
| 2006/0067323 A1* | 3/2006 | Beck | H04L 29/06027 370/395.2 |
| 2006/0126596 A1* | 6/2006 | Shieh | H04L 29/06027 370/352 |
| 2006/0171299 A1* | 8/2006 | Skubisz | H04L 29/06027 370/218 |
| 2007/0025301 A1* | 2/2007 | Petersson et al. | 370/338 |
| 2007/0147342 A1* | 6/2007 | Piercy et al. | 370/352 |
| 2007/0189279 A1* | 8/2007 | Thalanany et al. | 370/356 |

* cited by examiner

*Primary Examiner* — Khaled Kassim
(74) *Attorney, Agent, or Firm* — H.C. Park & Associates, PLC (57) ABSTRACT

A media transmission method and apparatus enable direct media transmission between terminals in a network by providing each terminal with information about the other terminal during signaling for media transmission, so that data transformation in an exchange system is not needed. As a result, media transmission quality is improved, and transmission delay is reduced.

17 Claims, 7 Drawing Sheets

```
Struct CONN_INFO_TYPE {
            unsigned short         ch;
            unsigned char          DestIP[4];
            unsigned char          DestMAC[6];
            unsigned short         DestRTPPort;
            unsigned char          CodecType;
            unsigned char          DfmfType;
} CONN_INFO;
```

MEDIA TRANSMISSION METHOD AND APPARATUS

CLAIM OF PRIORITY

This application makes reference to, incorporates the same herein, and claims all benefits accruing under 35 U.S.C. §119 from an application for MEDIA TRANSMISSION APPARATUS AND METHOD earlier filed in the Korean Intellectual Property Office on Mar. 8, 2005 and there duly assigned Ser. No. 10-2005-0019337.

BACKGROUND OF THE INVENTION

1. Field of the Invention

The present invention relates to a media transmission method and apparatus for a network. More particularly, the present invention relates to a media transmission method and apparatus which can reduce transmission quality degradation and transmission delay which occur because media is being transmitted through an exchange system.

2. Description of the Related Art

Early networks were classified into a voice network through which voice was transmitted and a data network through which data was transmitted. That is, voice was transmitted via the voice network, such as a Public Switched Telephone Network (PSTN), and data was transmitted via the data network, such as an IP network. However, in line with the ongoing development of network technology, the data network is being incorporated into the voice network, so that many present-day networks can transmit voice via the data network. Moreover, some present-day networks can transmit media containing video as well as voice. Voice over Internet Protocol (VoIP) technology is a representative technology employed to transmit voice via a data network, wherein voice in packetized form is transmitted over an IP network. The VoIP technology performs session setting and information exchange for transmitting voice by a signaling procedure, and transmits voice via the exchanged information during the set session.

A network includes an exchange system, a proxy server, and an IP network. Terminals A and B exchange voice via the network. The exchange system is an exchange system which has an integration function for exchanging both voice and data. Hereinafter, the term exchange system is used to refer to an exchange system which has such an integration function, unless otherwise stated.

Voice over Internet Protocol (VoIP) technology separately runs a media control function and a media transmission function.

Signaling is performed by the proxy server, which performs a function for initializing access to a receiving party instead of an originating party. Some terminals can directly call the opposite terminal without going through the proxy server.

A signal processor performs signaling for voice transmission, and a media processor and an Ethernet switch perform voice transmission after signaling. However, the terminals A and B connected to the exchange system cannot directly transmit data to each other even after signaling ends. This is because the terminal A cannot obtain information about the terminal B that it desires to communicate with. Information obtained by the terminals A and B after signaling is information of the exchange system rather than information of the opposite terminal. Therefore, there can be a case where an independent protocol, other than a standard protocol, is used between the terminal A and the exchange system. As a result, the terminals A and B must transmit voice to each other via the exchange system. That is, the terminal A can transmit voice to the terminal B by first transmitting voice to the exchange system which then relays the voice to the terminal B. Likewise, voice to be transmitted from the terminal B to the terminal A is transmitted to the terminal A via the exchange system.

That is, voice transmission between the terminals A and B must be performed via the media processor of the exchange system. However, the media processor must perform data transformation for the voice transmission. Voice transmitted between the terminals A and B via the media processor must undergo transformation from a voice packet to a Pulse Code Modulation (PCM) voice signal and from the PCM voice signal to the voice packet. Such data transformation causes degradation of voice quality and transmission delay. In addition, the media processor of the exchange system uses an unnecessary voice compression codec, leading to an overuse of resources. Such problems occur in the transmission of other media such as video, as well as voice.

SUMMARY OF THE INVENTION

It is an object of the present invention to provide a media transmission method and apparatus in which media transmission is performed directly between terminals in an exchange system without data transformation on a network.

It is another object of the present invention to provide a media transmission method and apparatus which reduce transmission delay and transmission quality degradation that occur due to data transformation in an exchange system during media transmission.

In order to achieve these and other objects, the present invention provides a media transmission apparatus in an exchange system, the apparatus comprising a signal processor adapted to: generate a session setting request message containing information of a first terminal of a network and information of the exchange system; transmit the session setting request message to a second terminal of the network in response to a message requesting a session setting for a media transmission between the first and second terminals being received; extract information of the second terminal from a response message to the session setting request message received from the second terminal; generate a message containing the information of the second terminal; and transmit the message containing the information of the second terminal to the second terminal to provide information for a session setting between the first and second terminals.

The present invention further provides a media transmission apparatus in an exchange system, the media transmission apparatus comprising a signal processor adapted to: produce a session setting request message containing information about a first terminal of a network; transmit the session setting request message to a second terminal of the network via the exchange system; receive a message containing information about the second terminal from the exchange system to obtain the information about the second terminal; and enable the first terminal to perform media communication with the second terminal using the obtained information about the second terminal.

The present invention further provides a media transmission apparatus for a first terminal that desires to communicate media with a second terminal in a network, the media transmission apparatus comprising a signal processor adapted to: produce a message containing information about first terminal and transmit the message to an exchange system for signaling upon a session setting request message containing information of the exchange system and information about the second terminal being received from the exchange system; and perform media communication with the second terminal using the information about the second terminal contained in the session setting request message upon a session with the second terminal being set.

The present invention further provides a media and data integration network comprising: a first terminal adapted to produce and transmit a session setting request message containing information about itself, obtain information of a second terminal from a message received corresponding to the session setting request message, and perform media communication with the second terminal using the obtained information; an exchange system adapted to receive the session setting request message from the first terminal, produce a session setting request message containing the information of the first terminal contained in the received session setting request message from the first terminal and information about itself and transmit the produced session setting request message, obtain information of the second terminal from a response message corresponding to the session setting request message received from the second terminal, produce a message containing the obtained information of the second terminal, and transmit the message to the first terminal; and wherein the second terminal is adapted to receive the session setting request message from the exchange system to produce a message containing information about itself, transmit the produced message to the exchange system using the information of the exchanged system obtained from the session setting request message, and perform media communication with the first terminal using the information of the first terminal obtained from the session setting request message.

The present invention further provides a media transmission method in an integration exchange system which performs signaling for media communication between terminals in a network, the method comprising: receiving a message requesting session setting for media transmission with a second terminal and containing information of a first terminal, from the first terminal; obtaining the information of the first terminal from the message received from the first terminal and producing a session setting requesting message containing the information of the first terminal and information about itself; transmitting the produced session setting request message to the second terminal; receiving a response message to the session setting request message from the second terminal and obtaining information of the second terminal from the received response message; and producing a message containing the information of the second terminal and transmitting the message to the first terminal.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings, in which like reference symbols indicate the same or similar components, wherein.

DETAILED DESCRIPTION OF THE INVENTION

Figure 1:
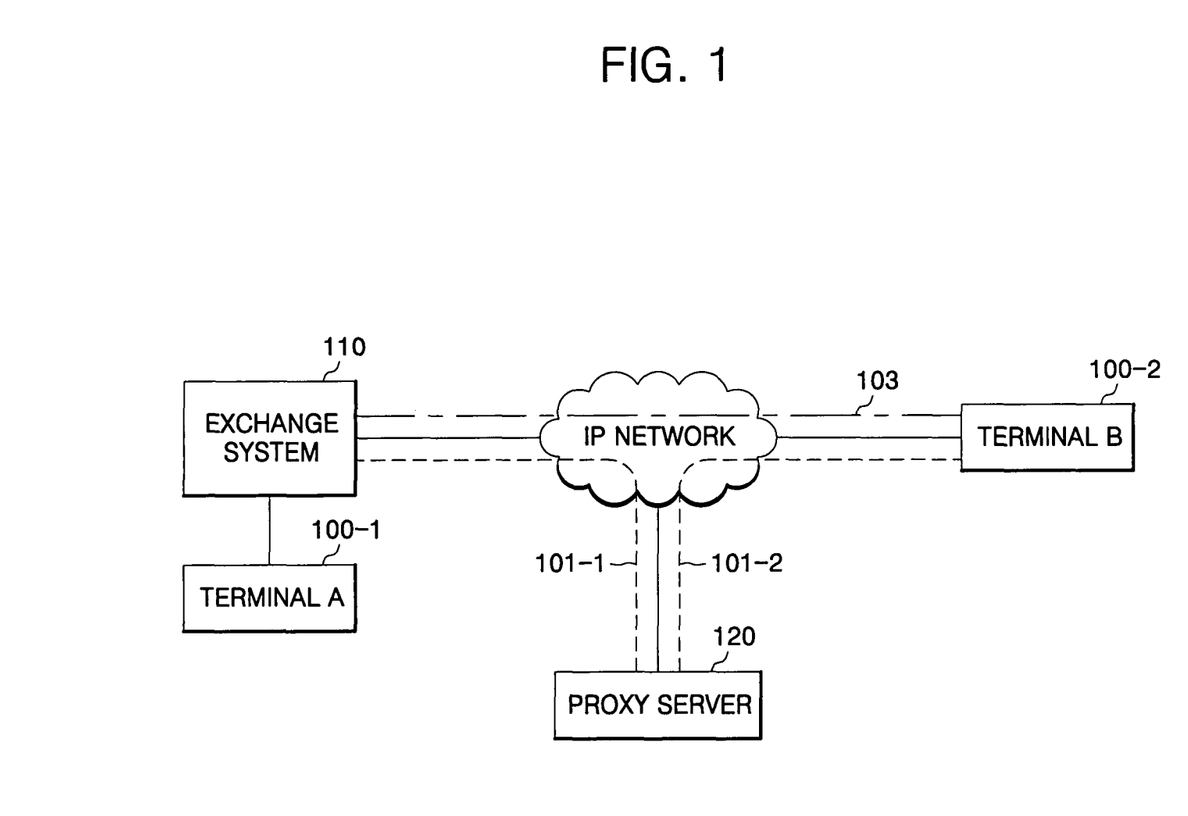
FIG. 1 is a block diagram of a network.

FIG. 1 is a block diagram of a network. As shown in FIG. 1, the network includes an exchange system 110, a proxy server 120, and an IP network. Terminals A 100-1 and B 100-2 exchange voice via the network. The exchange system 110 is an exchange system which has an integration function for exchanging both voice and data. Hereinafter, the term exchange system is used to refer to an exchange system which has such an integration function, unless otherwise stated.

Voice over Internet Protocol (VoIP) technology separately runs a media control function and a media transmission function. In FIG. 1, reference numerals 101-1 and 101-2 denote signaling paths between the terminals A 100-1 and B 100-2, and a reference numeral 103 denotes a data transmission path between the terminals A 100-1 and B 100-2. Data transmission is performed using information obtained during a signaling procedure after the signaling procedure ends.

As shown in FIG. 1, signaling is performed by the proxy server 120, which performs a function for initializing access to a receiving party instead of an originating party. Some terminals can directly call the opposite terminal without going through the proxy server 120.

Figure 2:
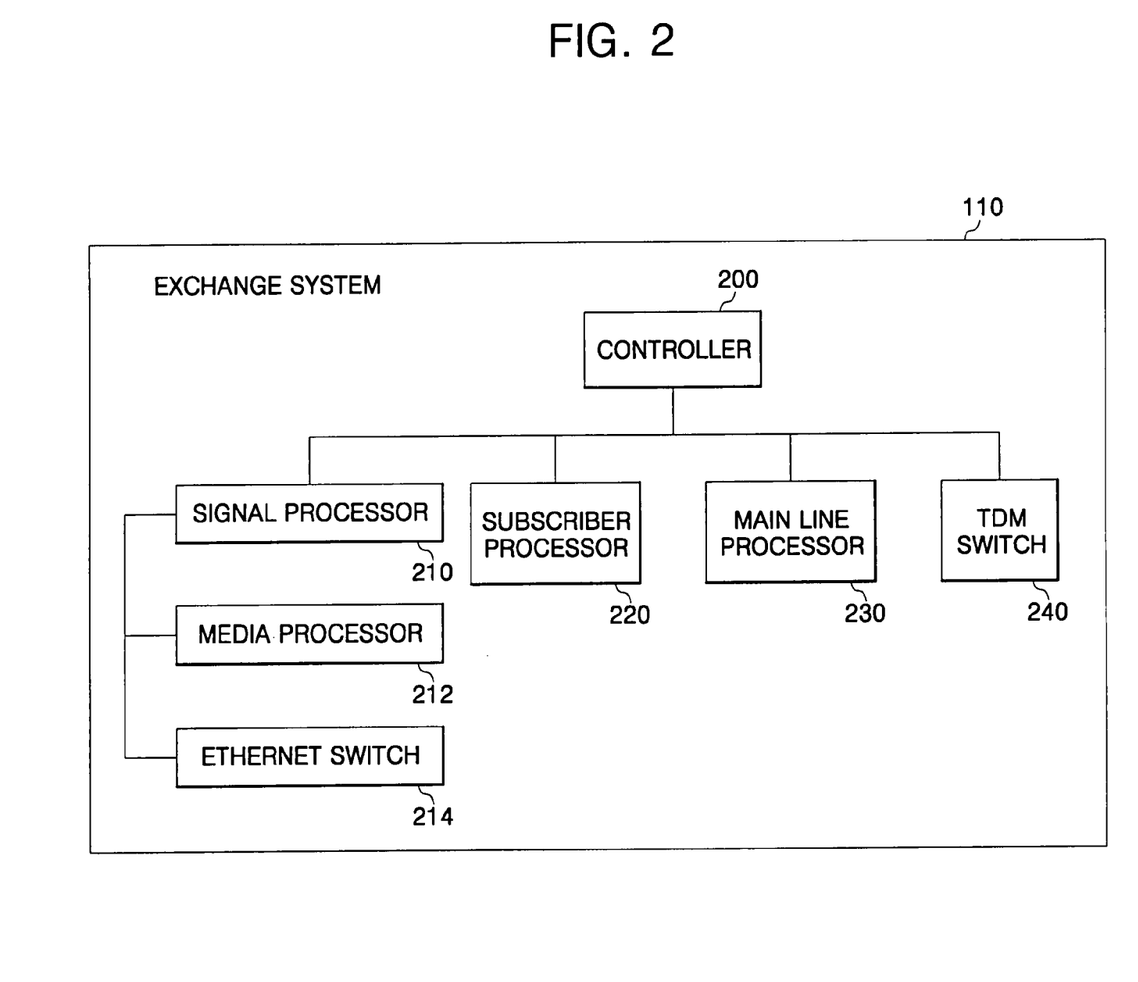
FIG. 2 is a block diagram of an exchange system.

The exchange system employed for VoIP transmission is explained below with reference to FIG. 2. FIG. 2 is a block diagram of an exchange system.

A signal processor 210 performs signaling for voice transmission, and a media processor 212 and an Ethernet switch 214 perform voice transmission after signaling. However, the terminals A 100-1 and B 100-2 connected to the exchange system 110 cannot directly transmit data to each other even after signaling ends. This is because the terminal A 100-1 cannot obtain information about the terminal B 100-2 that it desires to communicate with. Information obtained by the terminals A 100-1 and B 100-2 after signaling is information of the exchange system 110 rather than information of the opposite terminal. Therefore, there can be a case where an independent protocol, other than a standard protocol, is used between the terminal A 100-1 and the exchange system 110. As a result, the terminals A 100-1 and B 100-2 must transmit voice to each other via the exchange system 110. That is, the terminal A 100-1 can transmit voice to the terminal B 100-2 by first transmitting voice to the exchange system 110 which then relays the voice to the terminal B 100-2. Likewise, voice to be transmitted from the terminal B 100-2 to the terminal A 100-1 is transmitted to the terminal A 100-1 via the exchange system 110.

Figure 3:
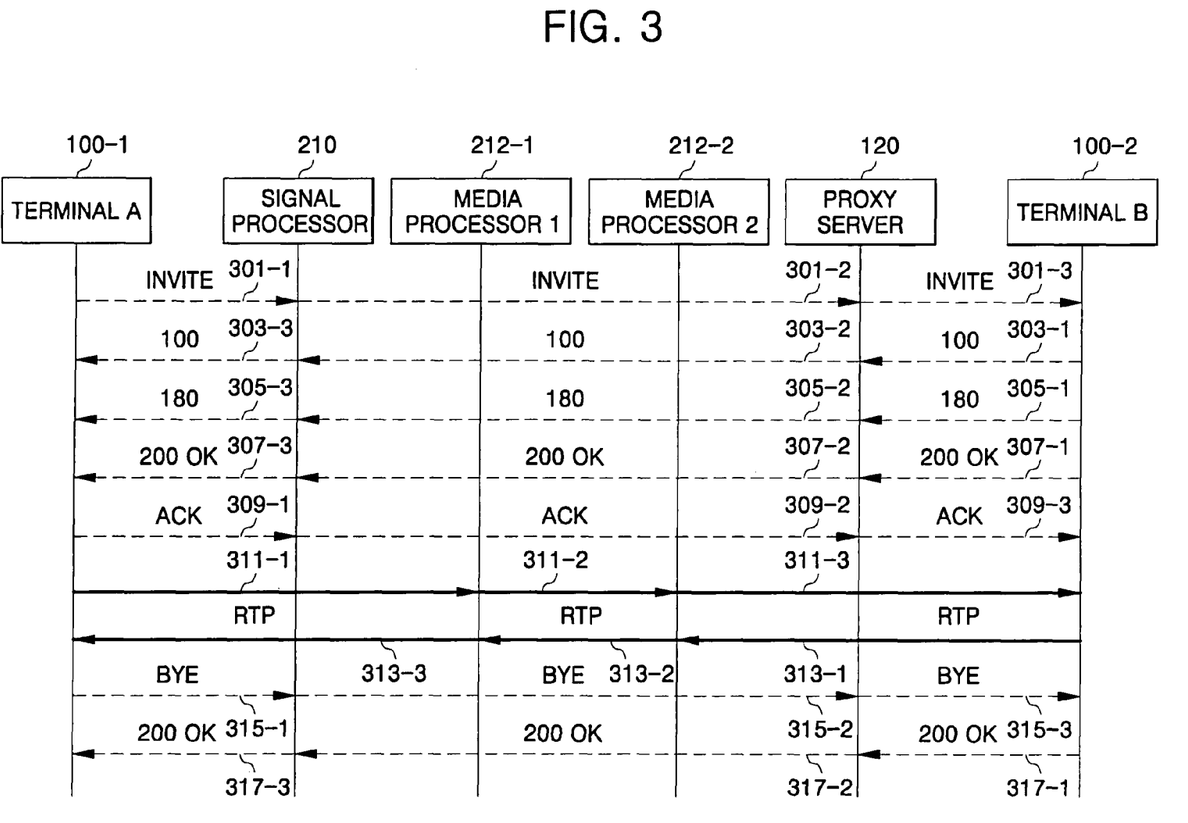
FIG. 3 is a view of signaling and voice transmission procedures for media transmission.

Signaling and voice transmission procedures are explained below with reference to FIG. 3. FIG. 3 is a flowchart of signaling and voice transmission procedures.

FIG. 3 shows Session Initiation Protocol (SIP) signaling and transmission of voice packets among the terminal A 100-1, the proxy server 120, and the terminal B 100-2. The media processor 212 of FIG. 3 is functionally classified into a first media processor 212-1, which is connected to the terminal A 100-1, and a second media processor 212-2, which is connected to the terminal B 100-2.

FIG. 3 shows SIP signaling and transmission of voice packets among the terminal A 100-1, the proxy server 120, and the terminal B 100-2. The media processor 212 of FIG. 3 is functionally classified into a first media processor 212-1, which is connected to the terminal A 100-1, and a second media processor 212-2, which is connected to the terminal B 100-2.

As shown in FIG. 3, the terminal A 100-1 and the external terminal B 100-2 perform session setting through SIP signaling before a voice transmission. In FIG. 3, INVITE messages 301-1 to 301-3, 100 messages 303-1 to 303-3, 180 messages 305-1 to 305-3, 200 OK messages 307-1 to 307-3, and ACK messages 309-1 to 309-3, are SIP messages which are used for session setting. When a signaling procedure is completed, voice transmission is performed between the terminals A 100-1 and B 100-2 using real-time transport protocols (RTPs) 311-1 to 311-3 and 313-1 to 313-3. In voice transmission between the terminals A 100-1 and B 100-2, the terminals A 100-1 and B 100-2 finish a session by exchanging BYE messages 315-1 to 315-3 and 200 OK messages 317-1 to 317-3. However, in a voice transmission using the RTP, signaling is performed between the terminal A 100-1 and the exchange system 110, and between the exchange system 110 and the terminal B 100-2, and so the terminal A 100-1 and the terminal B 100-2 cannot get information for transmitting data to each other. That is, the terminals A 100-1 and B 100-2 cannot directly transmit data to each other, and data transmission between the terminals A 100-1 and B 100-2 can be performed only via the exchange system 110, i.e., the media processor 212 of the exchange system 110.

In other words, voice transmission between the terminals A 100-1 and B 100-2 must be performed via the media processor 212 of the exchange system 110. However, the media processor 212 must perform data transformation for the voice transmission. Voice transmitted between the terminals A 100-1 and B 100-2 via the media processor 212 must undergo transformation from a voice packet to a Pulse Code Modulation (PCM) voice signal and from the PCM voice signal to the voice packet. Such data transformation causes degradation of voice quality and transmission delay. In addition, the media processor 212 of the exchange system 110 uses an unnecessary voice compression codec, leading to an overuse of resources. Such problems occur in the transmission of other media such as video, as well as voice.

The present invention is described more fully hereinafter with reference to the accompanying drawings, in which exemplary embodiments of the present invention are shown.

In the present invention, two terminals that are to transmit media to each other via a network have information about one another, so that media transmission is performed directly between the two terminals without using a media processor of an exchange portion. The information required for directly transmitting media between the two terminals is obtained through a signaling procedure.

A terminal provides its information to another terminal and obtains information from the other terminal during the signaling procedure. Each terminal can perform direct media transmission and reception using the information obtained from the other terminal.

The exchange system of the present invention provides information about other terminals to each terminal so that direct media transmission can be performed between terminals that are to transmit media to each other.

An embodiment of the present invention that will be explained below uses an OFFICESERV® system for transmitting VoIP data as the exchange system. In the embodiment of the present invention, a Session Initiation Protocol (SIP) is used for signaling. That is, messages used for signaling are SIP messages unless specifically stated otherwise. The embodiment of the present invention described below uses the OFFICESERV® system and SIP signaling for ease of understanding, but the present invention is not so limited. In the embodiment of the present invention discussed below, a description of SIP has been omitted because the details of SIP have already been disclosed in RFC 2543, RFC 3261, etc.

Signaling for voice transmission between terminals starts when a transmitting terminal transmits an INVITE message, which is a session setting request message.

The terminal A 100-1 which desires to transmit/receive voice to/from the other terminal produces an INVITE message containing information about itself and transmits the INVITE message to the terminal B 100-2, whereby a signaling procedure for voice transmission starts. Information about the terminal A 100-1 contained in the INVITE message includes an IP address, a Media Access Control (MAC) address, an RTP port, a codec type, and a DTMF type. Through signaling with the terminal B 100-2, the terminal A 100-1 can obtain an IP address, a MAC address, an RTP port, a codec type, and a DTMF type of the terminal B 100-2. Such information about each terminal 100-1 or 100-2 is used for voice transmission with the other terminal. The INVITE message is transmitted between the terminal A 100-1 and the terminal B 100-2 via the signal processor 210 of the exchange system 110. The signal processor 210 obtains information about the terminal A 100-1 from the INVITE message received from the terminal A 100-1, and then produces an INVITE message containing information about itself as well as the information about the terminal A 100-1 and transmits it to the terminal B 100-2.

The terminal B 100-2 receives the INVITE message from the exchange system 110 and obtains the information about the exchange system 110 and the information about the terminal A 100-1 from the INVITE message. The terminal B 100-2 produces a message that contains its information and transmits it to the exchange system 110 in response to the INVITE message. The terminal B 100-2 performs voice transmission with the terminal A 100-1 using the information about the terminal A 100-1 obtained from the INVITE message when signaling is completed so that a session is set.

That is, the exchange system 110 provides information about the other terminal to each of two terminals that desire to engage in voice communication. To enable this function, when signaling for media transmission with the terminal B 100-2 is requested by the terminal A 100-1, the exchange system 110 transmits the information about the terminal A 100-1 together with information about itself to the terminal B 100-2, and obtains the information about the terminal B 100-2 and transmits it to the terminal A 100-1. Consequently, the two terminals A 100-1 and B 100-2 are each provided with information about the other terminal. The configuration and operation of the exchange system of the present invention will be described below with reference to the accompanying drawings.

FIG. 2 is a block diagram of an exchange system. The OFFICESERV® system has a configuration similar to that of the exchange system of FIG. 2. The exchange system of the present invention is explained below assuming that the OFFICESERV® system has the configuration of FIG. 2.

As shown in FIG. 2, the OFFICESERV® system includes a controller 200, a signal processor 210, a media processor 212, an Ethernet switch 214, a subscriber processor 220, a main line processor 230, and a Time Division Multiplex (TDM) switch 240. The OFFICESERV® system is an all-in-one device which combines various components such as a typical telephone system, an Internet telephone system, a wireless LAN, a router, and a LAN switch, and can contain more components than those shown in FIG. 2. However, components that are not required for the present invention are neither illustrated in the drawings nor described herein.

The subscriber processor 220 of FIG. 2 is used for matching with an extension subscriber terminal, the main line processor 230 is used for matching with a main line, i.e., Public Switched Telephone Network (PSTN), and the TDM switch 240 is used to divide plural TDM voice signals into uniform time units and transmit them. The signal processor 210, the subscriber processor 220, the main line processor 230, and the TDM switch 240 can be connected to each other via a PCM serial bus, and to the controller 200 via a CPU bus, and are controlled by the controller 200.

The signaling processor 210 is a module that performs a SIP with the terminal A 100-1 and a SIP with the terminal B 100-2. The media processor 212 converts VoIP data, which is voice packet data received from the terminal connected to the Ethernet switch 214, into a PCM voice signal, compresses the PCM voice signal, converts the PCM voice signal back into VoIP data, and transmits the VoIP data to the Ethernet switch 214. The signal processor 210, the media processor 212, and the Ethernet switch 214 can be connected via Ethernet.

Signaling, which involves information exchange for media transmission, i.e., VoIP data transmission, is performed in the signal processor 210. The signal processor 210 performs signaling using the SIP as described above.

In order that an independent protocol other than a standard SIP can be applied between the terminal A 100-1 and the signal processor 210 of the exchange system 110, the signal processor 210 can have a function for applying the independent protocol together with a standard SIP function. The signal processor 210 performs signaling with the terminal B 100-2 using the standard SIP and performs signaling with the terminal A 100-1 using the independent protocol. In other words, when the terminal A 100-1 uses the independent protocol, the signal processor 210 of the exchange system 110 provides the terminal A 100-1 with the information about the terminal B 100-2 obtained from the terminal B 100-2 via the SIP by using the independent protocol of the terminal A 100-1.

Among the information exchanged through signaling, additional information exchanged in the present invention can include a connection address, a codec type, a RTP, etc. The connection address is used to determine the other terminal to which corresponding VoIP data is to be transmitted. The codec type information is used to inform the other terminal of the type of codec which the terminal uses to encode corresponding VoIP data. The terminal decodes the corresponding VoIP data using the codec type information. The reason why the code type information is needed is because encoding or decoding of the voice signal is performed in the respective terminals rather than in the exchange system 110. The RTP port information is used to transmit the VoIP data using the RTP. That is, when a protocol other than the RTP is used for transmission of the VoIP data, port information for a corresponding protocol is required. However, since transmission of the VoIP data is performed by the RTP, the RTP port information is listed as representative port information. Furthermore, Dual Tone Multi-Frequency (DTMF) information can be contained as VoIP data transmission information.

That is, the signal processor 210 performs signaling containing VoIP data transmission information for transmission of the VoIP data. If signaling is performed using the SIP, the signal processor 210 performs signaling using the SIP message whose body has a Session Description Protocol (SDP) which contains VoIP data transmission information, i.e., information about the terminal, etc.

Figure 4:
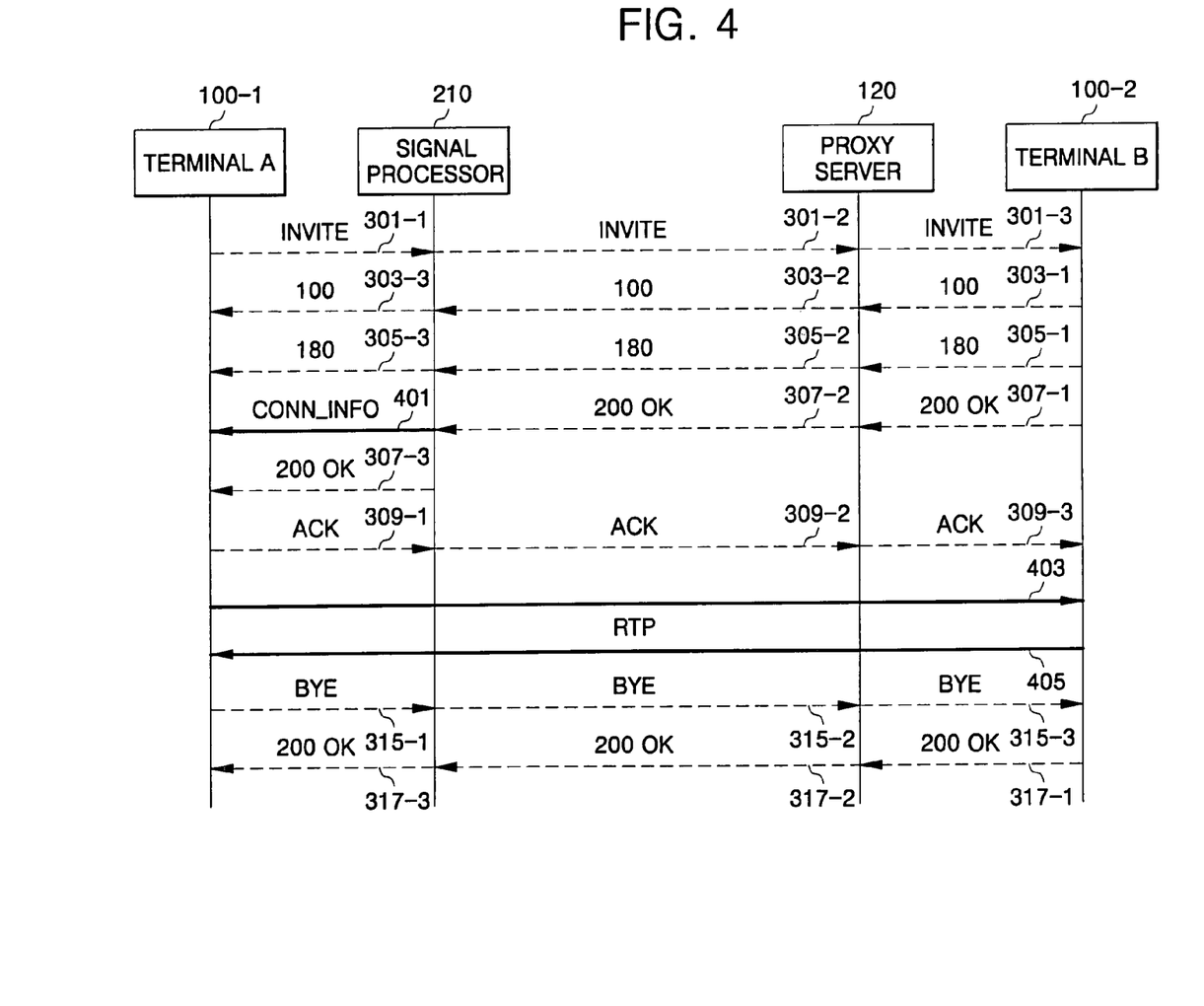
FIG. 4 is a view of signaling and data transmission procedures performed by a media transmission apparatus according to an embodiment of the present invention.

FIG. 4 is a view of a signaling procedure and a data transmission procedure according to an embodiment of the present invention.

As shown in FIG. 4, the signal processor 210 of the exchange system 110 transmits a CONN_INFO message 401, which is a SIP message containing VoIP data transmission information, to a terminal which requests transmission of the VoIP data during signaling. The CONN_INFO message 401 can include the connection address of the other terminal, the codec type, the RTP port, etc. The terminal which requests transmission of the VoIP data performs a direct transmission of the VoIP data with the other terminal, that is, 403 and 405, without going through the media processor 212 of the exchange system 110, using information contained in the CONN_INFO message 401 received from the signal processor 210 of the exchange system 110. Other processes of FIG. 4 are the same as those in FIG. 3.

Figure 5:
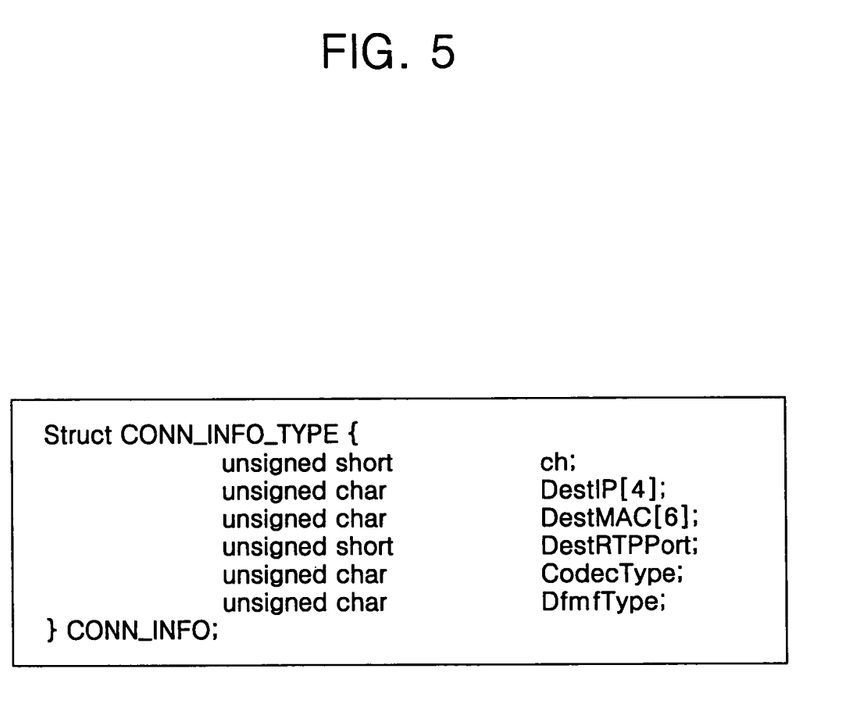
FIG. 5 is an example of terminal information contained in signaling information according to an embodiment of the present invention.

FIG. 5 is a view of voice transmission information contained in signaling information according to an embodiment of the present invention.

FIG. 5 shows one of the embodiments of the CONN_INFO message 401 of FIG. 4. As shown in FIG. 5, information about the other terminal, such as the IP address, the MAC address, the RTP port, the codec type, and the DTMF type information are contained in the CONN_INFO message 401.

Figure 6:
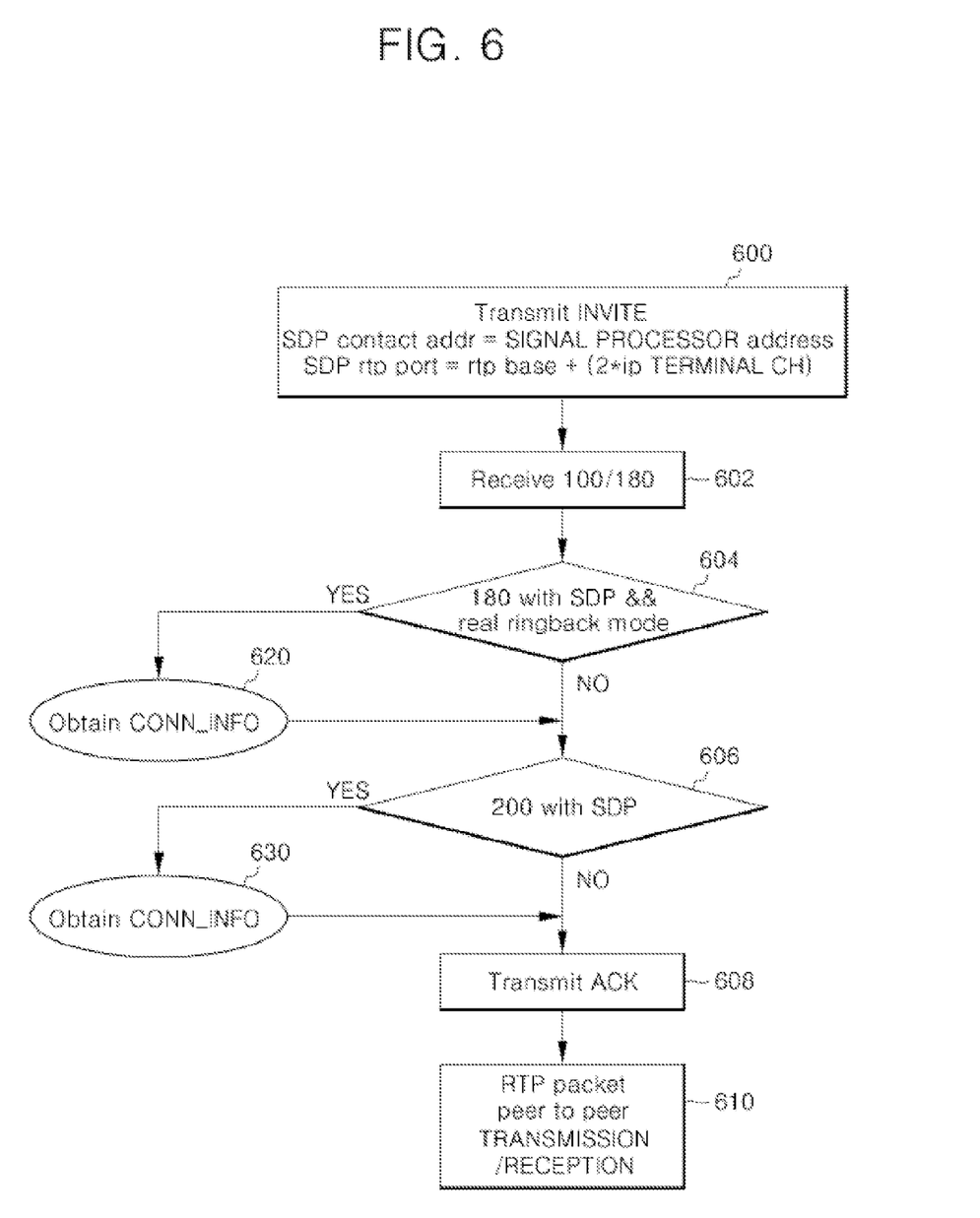
FIG. 6 is a flowchart of a signaling procedure performed by a terminal which transmits media according to an embodiment of the present invention.

FIG. 6 is a flowchart of a signaling procedure performed by a terminal that transmits voice according to an embodiment of the present invention.

Referring to FIG. 6, in step 600, the terminal A 100-1, which desires to transmit VoIP data, transmits the INVITE message containing the connection address and the RTP port number to the signal processor 210 of the exchange system 110. The connection address contained in the INVITE message is an address of the signal processor 210 of the exchange system 110, and the RTP port number is assigned by the following formula:

RTP port number=RTP base port+(2×Terminal channel number).

In step 602, the terminal A 100-1 receives 100 and 180 from the terminal B 100-2 after transmitting the INVITE message. In step 604, the terminal A 100-1 checks whether an SDP is contained and a ring back tone mode of the system is set when 180 is received. If the SDP is contained and the ring back tone mode is set, the terminal A 100-1 obtains information for transmission of VoIP data which is transmitted from the other terminal B 100-2 in step 620. The information is obtained from the message received by the terminal A 100-1 after going through the signal processor 210 of the exchange system 110. In step 606, when a 200 OK message is received, the terminal A 100-1 checks whether the SDP is contained. If the SDP is contained, the terminal A 100-1 obtains VoIP data transmission information in step 630. In step 608, the terminal A 100-1 transmits an ACK message in response to the 200 OK message to thus complete the signaling procedure by the signal processor 210. As a result, in step 610, the VoIP data is transmitted between the terminal A 100-1 and the terminal B 100-2.

The above embodiment of the present invention has been explained assuming that the terminal A 100-1 belongs to a private network and port forwarding for the RTP port is already set in a router. If the terminal A 100-1 uses an authorized IP address, the authorized IP address should be used as the connection address instead of the address of the signal processor 210 of the exchange system 110, and port forwarding does not need to be set.

Figure 7:
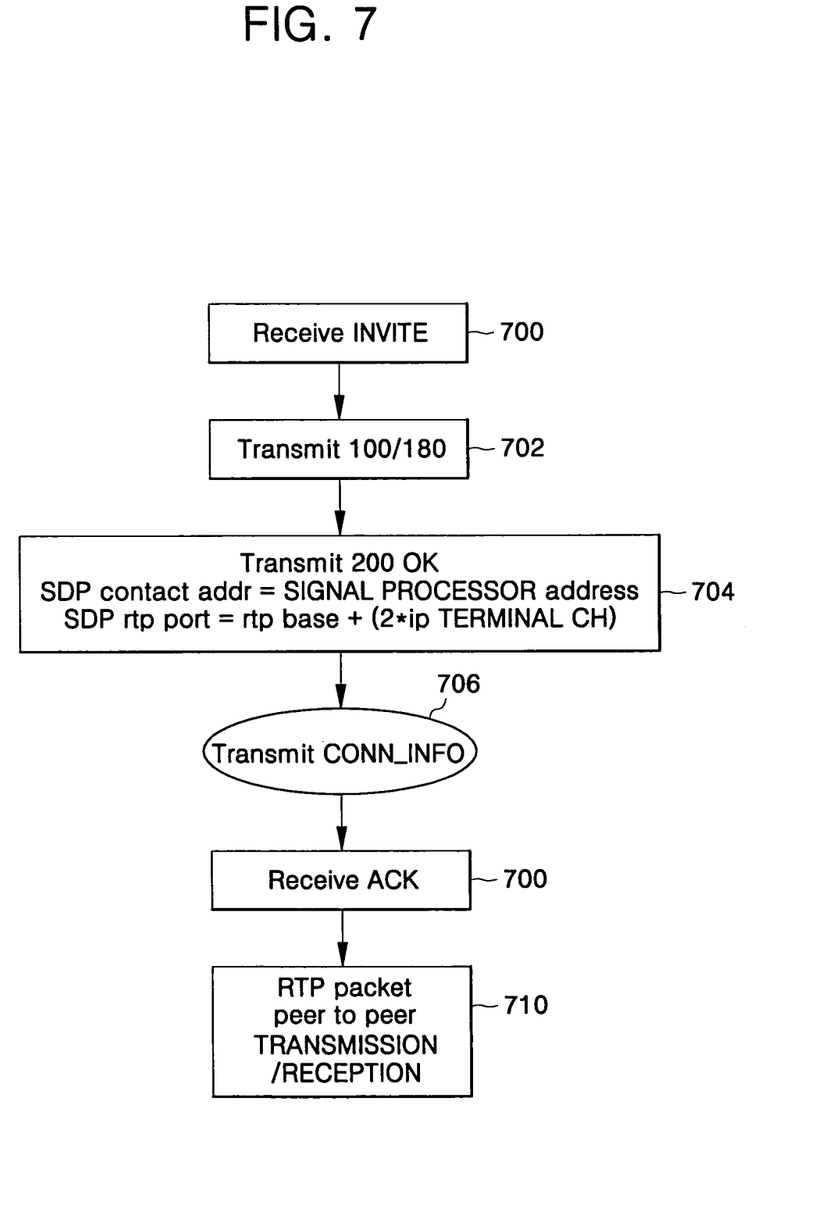
FIG. 7 is a flowchart of a signaling procedure performed by a receiving terminal corresponding to a signaling procedure of the transmitting terminal according to an embodiment of the present invention.

FIG. 7 is a flowchart of a signaling procedure performed by a terminal receiving voice according to an embodiment of the present invention.

In FIG. 7, unlike FIG. 6, the terminal A 100-1 is a receiving terminal. That is, FIG. 7 shows a procedure in which the terminal A 100-1 receives the INVITE message from the terminal B 100-2 to open a media session. In step 700, the terminal A 100-1 receives the INVITE message from the terminal B 100-2. In step 702, the terminal A 100-1 transmits 100 and 180 to the terminal B 100-2. In step 704, the terminal A 100-1 transmits a 200 OK message to the terminal B 100-2 and then extracts its information. In step 706, the terminal A 100-1 transmits the SIP message containing the extracted information to the terminal B 100-2. The terminal A receives an ACK message from the terminal B 100-2 in step 708, and so performs transmission of the VoIP data with the terminal B 100-2 in step 710.

In the above-described embodiment of the present invention, VoIP data is transmitted through the OFFICESERV® system, but the present invention is not so limited. The present invention can be applied to any kind of media transmission which contains video as well as voice and has a signaling procedure.

The exchange system of the present invention processes call signaling between the terminals using standard SIP signaling, and enables the media packet to be directly transmitted between the terminal A 100-1, which is an internal IP terminal, and the terminal B, which is an external IP terminal, using a message which transmits voice session information between the exchange system and the terminal. Thus, the VoIP function of the existing exchange system can be accommodated by the standard SIP signaling.

As described above, the media transmission method and apparatus of the present invention reduce transmission quality degradation and transmission delay because media is transmitted directly between terminals.

In addition, the media transmission method and apparatus of the present invention enable the VoIP function of the existing exchange system to be accommodated by standard SIP signaling, leading to extendable and reliable service.

What is claimed is:

1. A media transmission apparatus in an exchange system, the apparatus comprising a signal processor adapted to:
generate a session setting request message comprising information about a first terminal of a network and information about the exchange system;
transmit the session setting request message to a second terminal of the network in response to a message requesting a session setting for a media transmission between the first and second terminals being received;
extract information about the second terminal from a response message to the session setting request message received from the second terminal;
generate a message comprising the information about the second terminal; and
transmit the message comprising the information about the second terminal to the first terminal to provide information for a session setting between the first and second terminals and to perform media data transmission between the first and second terminals,
wherein the message requesting the session setting comprises an INVITE message of a Session Initiation Protocol (SIP) comprising an address of a signal processor of the exchange system and a Real Time Protocol (RTP) port number, which is assigned by the following formula:

RTP port number=RTP base port+(2*terminal channel number), and wherein the media data is transmitted directly between the first terminal and second terminal.

2. The apparatus of claim 1, wherein the information about the second terminal comprises connection information, codec type information, and RTP port information.

3. The apparatus of claim 2, wherein the information about the second terminal further comprises Dual Tone Multi Frequency (DTMF) information.

4. The apparatus of claim 1, wherein an independent protocol and an SIP are used between the first terminal and the exchange system.

5. The apparatus of claim 1, wherein the information about the first terminal, the information about the exchange system, and the information about the second terminal comprise a Session Description Protocol (SDP) of a SIP message.

6. A media transmission apparatus in an exchange system, the media transmission apparatus comprising a signal processor adapted to:
receive a message requesting a session setting for a media transmission between a first terminal and a second terminal from the first terminal;
produce a session setting request message comprising information about the first terminal of a network;
transmit the session setting request message to the second terminal of the network via the exchange system;
receive a message comprising information about the second terminal from the exchange system to obtain the information about the second terminal; and
enable the first terminal to perform media data transmission with the second terminal using the obtained information about the second terminal,
wherein the message requesting the session setting comprises an INVITE message of a Session Initiation Protocol (SIP) comprising an address of a signal processor of the exchange system and a Real Time Transport (RTP) port number, which is assigned by the following formula:

RTP port number=RTP base port+(2*terminal channel number), and wherein the media data is transmitted directly between the first terminal and the second terminal.

7. The apparatus of claim 6, wherein the session setting request message comprises a SIP message.

8. The apparatus of claim 6, wherein the media data transmission is performed using a RTP.

9. The apparatus of claim 6, wherein media data transmitted between the first terminal and the second terminal comprises Voice over Internet Protocol (VoIP) data.

10. A media and data integration network, comprising:
a first terminal adapted to produce and transmit a first session setting request message comprising information about the first terminal, to obtain information about a second terminal from a message received corresponding to the first session setting request message, and to perform media communication with the second terminal using the obtained information; and
an exchange system adapted to receive the first session setting request message from the first terminal, to produce a second session setting request message comprising the information about the first terminal contained in the received first session setting request message and information about the exchange system, to transmit the produced second session setting request message, to obtain information about the second terminal from a response message corresponding to the second session setting request message and received from the second terminal, to produce a message comprising the obtained information about the second terminal, to transmit the message comprising the obtained information about the second terminal to the first terminal, and to perform media data transmission between the first terminal and the second terminal,
wherein the second terminal is adapted to receive the second session setting request message from the exchange system, to produce a message comprising information about the second terminal, to transmit the produced message comprising information about the second terminal to the exchange system using the information about the exchange system obtained from the second session setting request message, and to perform direct media communication with the first terminal using the information about the first terminal obtained from the second session setting request message,
wherein the first session setting request message comprises an INVITE message of a Session Initiation Protocol (SIP) comprising an address of a signal processor of the exchange system and a Real Time Transport (RTP) port number, which is assigned by the following formula:

RTP port number=RTP base port+(2*terminal channel number), and wherein the media data is transmitted directly between the first terminal and the second terminal.

11. A media transmission method in an integration exchange system which performs signaling for media communication between terminals in a network, the method comprising:
receiving a first session setting request message from a first terminal, the first session setting request message requesting session setting for media transmission with a second terminal and containing information about the first terminal;
obtaining the information about the first terminal from the first session setting request message received from the first terminal and producing a second session setting request message comprising the information about the first terminal and information about the integration exchange system;
transmitting the produced second session setting request message to the second terminal;
receiving a response message to the second session setting request message from the second terminal and obtaining information about the second terminal from the received response message;
producing a message comprising the information about the second terminal and transmitting the message comprising the information about the second terminal to the first terminal; and
performing media data transmission between the first terminal and the second terminal,
wherein the first session setting request message comprises an INVITE message of a Session Initiation Protocol (SIP) comprising an address of a signal processor of the integration exchange system and a Real Time Transport (RTP) port number, which is assigned by the following formula:

RTP port number=RTP base port+(2*terminal channel number), and wherein the media data is transmitted directly between the first terminal and the second terminal.

12. The method of claim 11, wherein the information about the second terminal comprises connection information, codec type information, and RTP port information.

13. The method of claim 12, wherein the information about the second terminal further comprises Dual Tone Multi Frequency (DTMF) information.

14. The method of claim 11, wherein the second session setting request message comprises an INVITE message of a Session Initiation Protocol (SIP).

15. The method of claim 11, wherein the information about the first terminal, the information about the integration exchange system, and the information about the second terminal comprise a Session Description Protocol (SDP) of a SIP message.

16. The method of claim 11, wherein the media data transmitted between the first and second terminals comprises Voice over Internet Protocol (VoIP) data.

17. The method of claim 16, wherein the VoIP data is transmitted directly between the first terminal and the second terminal.

* * * * *